United States Patent
Lacey

[15] 3,698,681
[45] Oct. 17, 1972

[54] ON-OFF CLAMP FOR I. V. SYSTEMS
[72] Inventor: Robert L. Lacey, Des Plaines, Ill.
[73] Assignee: Illinois Tool Works Inc., Chicago, Ill.
[22] Filed: Dec. 15, 1970
[21] Appl. No.: 98,247

[52] U.S. Cl.............251/10, 24/129 R, 24/132 HL, 24/134 R, 24/248 SL
[51] Int. Cl................................................F16k 7/06
[58] Field of Search ....251/4, 6, 9, 10; 128/322, 346; 24/129 R, 129 D, 132 R, 132 HL, 134, 248 SL

[56] References Cited

UNITED STATES PATENTS

| | | | |
|---|---|---|---|
| 391,816 | 10/1888 | Packard | 251/9 X |
| 823,068 | 6/1906 | Mosley | 251/10 |
| 2,908,476 | 10/1959 | Hidding | 251/8 |
| 3,043,553 | 7/1962 | Gorman | 251/10 |
| 3,320,958 | 5/1967 | Nolan | 128/346 |
| 3,461,876 | 8/1969 | Miller | 251/10 X |

Primary Examiner—Henry T. Klinksiek
Assistant Examiner—Richard Gerard
Attorney—Robert W. Beart, Michael Kovac and Jack R. Halvorsen

[57] ABSTRACT

A clamp for control of fluid flow through tubing, such as in intravenous tubing systems, with a base through which the tubing is passed and releasably held in adjacency to a fixed abutment surface on the base, and with a member hingedly connected to the base and provided with a clamping member movable in unison therewith relative to the abutment surface for clamping the adjacent portion of the tubing thereagainst and closing or partially closing the same; there being provided mutually cooperating interlocking arms on the base and hinged member, respectively, for holding the same in predetermined tube clamping positions, and being relatively laterally movable to release the interlocking engagement between the arms to permit separating movement between the base and hinged member with the clamping member moving away from the abutment surface, thus releasing the constriction in the previously clamped tubing.

7 Claims, 7 Drawing Figures

PATENTED OCT 17 1972
3,698,681
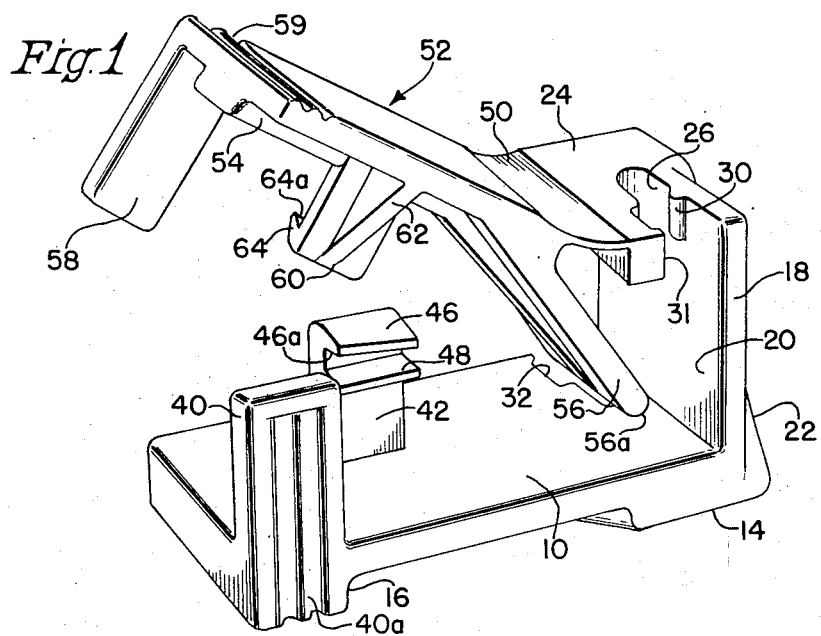
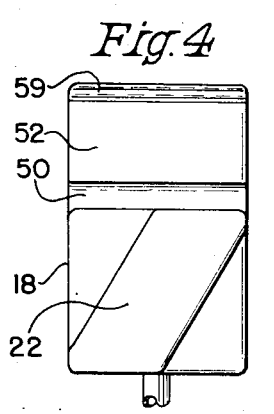
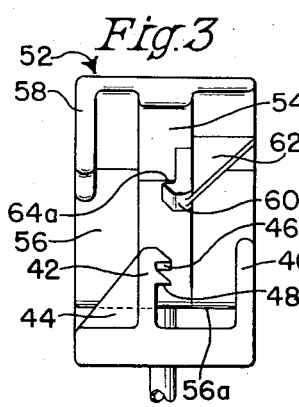
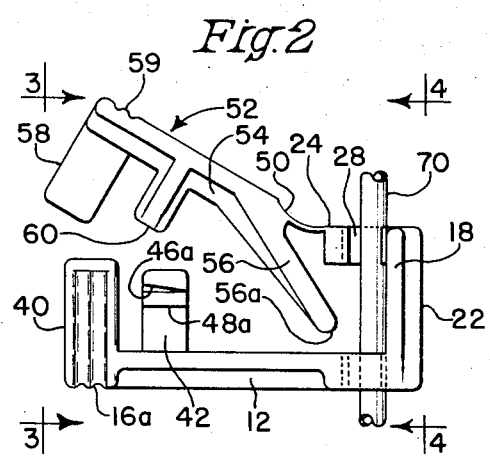
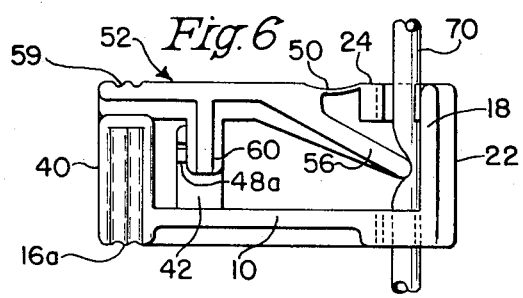
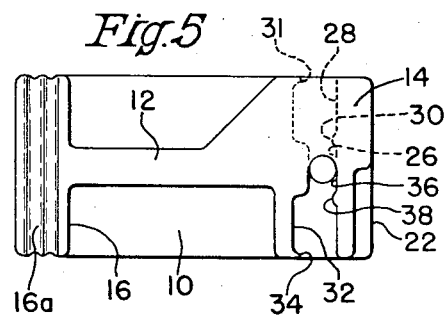
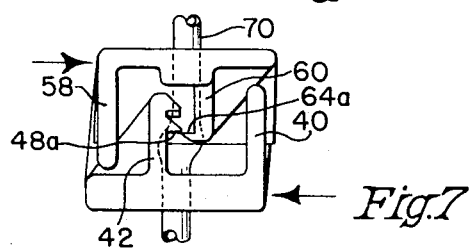
INVENTOR.
Robert L. Lacey
BY
His Att'ys

ON-OFF CLAMP FOR I. V. SYSTEMS

The present invention relates to a finger manipulated clamp for controlling fluid flow through a flexible tube such, for example, as for use with intravenous tubing systems in transferring fluids to or from a recipient or donor body.

In many known tube clamping arrangements, there is a squeezing action between intermediate surfaces of connected lever arms and locking means are provided. There are also tube clamping arrangements with wedging surfaces which are rotatable or slidable into tube constricting positions.

In many of these devices where there is some form of locking means it is often a simple matter to bring the locking means into operation for clamping the tube in constricted configuration for stopping or metering the fluid flow. However, it is often relatively more difficult and time-consuming to release the locking means and thus release the tube from its constricted configuration for free fluid flow or for removing the clamp from the tubing.

An object of the present invention is to provide a tube clamp with means facilitating assembly and releasable retention between the clamp and the tubing.

Another object of the invention is to provide a tube clamp enabling one hand, and even two finger operation thereof for clamping and releasing the tubing, thus providing rapid operation thereof with minimum movement of the tubing for comfort of the donor or recipient body.

A further object of the invention is to provide a tube clamp wherein tube constriction is accomplished by simple squeezing together of relatively hinged members with interengaging shoulder means for holding the same together, and wherein release of the tube constriction is accomplished by simple relative lateral movement between the hinged members for release of the interengaged shoulder means.

To the above ends, the clamp includes a base with a fixed abutment surface across which the tube is releasably mounted for constriction thereagainst by a clamping edge movable with a member hinged to the base. The base and hinged member are provided with mutually interengageable shoulder means for holding the same in tube constricting positions and with finger grip means to effect relative lateral movement between the base and hinged member for releasing the interengaged shoulder means.

For a more detailed understanding of the above and other objects of the invention and the brief description thereof, reference is made to the accompanying drawing and the more detailed description thereof in which:

FIG. 1 is a perspective view of the tubing clamp with the base and hinged member in normally separated position;

FIG. 2 is a slightly reduced side elevation of FIG. 1;

FIG. 3 is an end elevation of FIG. 2 in the direction of the arrows 3—3;

FIG. 4 is an end elevation of FIG. 2 in the direction of the arrows 4—4;

FIG. 5 is a bottom plan view of FIG. 2 with the tubing in initially assembled position;

FIG. 6 is a view similar to FIG. 2 but with the tubing shown in constricted position as the base and hinged member are brought together; and FIG. 7 is an end view of FIG. 6 showing relative lateral displacement between the base and hinged member to disengage the interlocking therebetween and permit release of the tubing from its constricted condition.

Referring to FIGS. 1 to 5 of the accompanying drawing, the clamp includes a base portion 10 having a central portion 12 of increased thickness for reinforcement and terminating in a transverse portion 14 or similar thickness across the rear edge thereof and in a transverse portion 16 of similar thickness across the front edge thereof with rib portions 16a for finger purchase. At the rear edge of the base there is an upstanding wall 18 presenting an inner abutment surface 20 and having a diagonal thicker portion 22 across the outer surface thereof for reinforcement. The upper edge of the upstanding wall 18 terminates in an inwardly extending ledge 24 opening to one side of the base from an inner aperture 26 through an outer wider recess 28 partially separated therefrom along the upstanding wall 20 by an inward vertical shoulder 30. An inward vertical shoulder 31 is disposed at the outer corner edge of the wider recess opposite to the wall surface 20. A similar reversely oriented recess arrangement is provided in the base opening at the opposite edge thereof. With reference to FIG. 5, this recess arrangement includes an outwardly opening relative wide recess 32 with a vertical corner shoulder 34 and communicating with a narrower inner aperture 36. A vertical shoulder 38 on the wall surface 20 reduces the entrance to the inner recess 36 which is in vertical alignment with the upper inner recess 26. The tubing may extend through these aligned recesses in the manner to be hereinafter described.

The forward portion of the base 10 is provided with a corner post 40 with vertical ribs 40a for finger purchase. Inwardly of the front edge of the base, there is provided another vertical post or arm 42 spaced slightly inwardly from the opposite side of the base and reinforced by a vertical inclined strut portion 44. The inner upper end portion of the post 42 is provided with inwardly extending spaced ledges 46, 48 (two in number which may be varied) presently downwardly facing shoulder surfaces 46a, 48a, respectively, with the upper shoulder surface 46a, inclined downwardly and rearwardly toward the wall surface 20 for a purpose to be pointed out hereinafter. A flexible hinge leaf 50 of plastic or similar material is attached along the inner upper edge of the ledge 24 with inherent memory characteristics to tend toward the upwardly curved position thereof as shown in FIGS. 1 and 2.

A hinged top member 52 has the inner edge thereof suitably attached to the hinge leaf 52 to normally assume the open position of FIGS. 1 and 2. The under surface of the member 52 is provided with a central reinforcing rib 54 which extends rearwardly and merges into a rearwardly and downwardly inclined clamping or lever arm 56 integral with the hinged member 52 and movable in unison therewith. The free transverse edge 56a of the arm 56 is transversely substantially coextensive with the width of the abutment surface 20 and is located in adjacency thereto. The front free edge of the hinged member 52 is provided with a depending corner post 58 opposite to the base post 40 and may also be externally ribbed for finger purchase to merge with ribs 59 across the adjacent end of the top of the hinged member 52. Disposed slightly inwardly from the opposite side of the hinged member 52 is a depending post or arm 60 in cooperative adjacency to the base post or arm 42. This post or arm 60 is reinforced by a triangular web or strut 62 and is provided with an inwardly extending ledge 64 presenting an upwardly facing shoulder surface 64a cooperative selectively with the shoulder surfaces 46a, on the post 42 in holding the hinge member 52 to the base 10 in positions such as that shown in FIG. 6.

In assembling the tubing 70 and clamp, and referring to FIG. 1, the tubing may be passed diagonally across the abutment surface 20 to initially lie in the wider recesses 28 and 32. This can be accomplished by threading the tubing through these recesses, or by passing the same inwardly from the open end of the clamp and beneath the clamping edge 56a of the lever arm 56. When so positioned, the surface portions of the tubing toward the open ends of the recesses 28, 32 are squeezed toward the smaller recesses 26, 36, or these surface portions are held by fingers of one hand and the entire clamp rotated in a clockwise direction by the other hand — either operation resulting in the tubing being urged past the shoulders 30, 38 into the inner recesses 26, 36, respectively, in which position the tubing will be trapped in assembly with the clamp but the tubing may be removed by substantially reverse manipulative operations. With the tubing 70 extending through the aligned recesses 26, 36 and traversing the abutment surface 20, as seen in FIG. 2, an operator may employ the fingers of one hand, for example the thumb and index finger, engaging the transverse ribbed portion 16a, 59 on the base and hinged member, respectively, to squeeze the same together so that the hinged member 52 will assume the position of FIG. 6 with the clamping edge 56a of the arm 56 closing the tube against the abutment surface 20 to close off fluid flow therethrough. In this position, the ledge 64 on the arm 60 will have been urged past the ledges 46, 48 on the arm 42 by the relative resiliency afforded by the hinge leaf 50 and the shoulder surface 64a will snap beneath the shoulder surface 48a for interlocking engagement therewith to hold the parts in the position of FIG. 6, or an intermediate position with the shoulder surface 64a engaged beneath the shoulder surface 46a which is inclined, as indicated above, to provide for complete surface contact with the surface of the shoulder 64a as the hinged member 52 assumes a slightly inclined position relative to the base. In such inclined position, the clamping edge 56a will withdraw slightly from the tubing reducing the constriction thereof and permit reduced flow of fluid therethrough, that is, reduced flow as compared with full flow when the clamping edge is in the position of FIG. 2. Or, alternatively, if a slightly larger size tubing is employed, such tubing might be completely closed when the shoulder surfaces 64a and 46a are in engagement. As a further possibility, a larger size of tubing could be located in the outer recesses 28 and 32 and releasably trapped therein by the shoulders 31, 34, respectively, and in this case, the tubing will extend diagonally across the abutment surface between the outer recesses for constriction thereof by the clamping edge 56a.

To release any constriction of tubing by releasing any interlocking engagement between the shoulder surface 64a and either shoulder surface 46a or 48a, reference is made to FIG. 7. The operator may employ two fingers of one hand, for example the thumb and index finger, to respectively engage the ribbed surfaces of the posts 58, 40 and squeeze the same together to cause offsetting thereof as permitted by the resiliency of the hinge leaf 50. This will effect lateral separation of the arms 60 and 42, as shown in FIG. 7, to effect disengagement of the shoulder surface 64a from either of the shoulder surfaces 46a, 48a. The inherent memory of the resilient hinge leaf 50 will tend to move the hinge member 52 outwardly to the position of FIGS. 1 and 2. Release of the finger grip on the posts 58, 40 will permit the inherent resiliency of the hinge leaf 50 to return the hinge member to its initial lateral position with the shoulder arms 60, 42 again in proper relative lapped orientation to permit engagement between the respective shoulder surfaces when the hinge member is again pressed toward the base for effecting control of fluid flow through the tubing by relative positioning of the clamping edge 56a with respect thereto. The posts 58, 40 will limit excessive inward movement of the hinged member 52 relative to the base when in normal lateral positions. The hinged member and base may be molded from suitable plastic materials and joined by adhesive or heat sealing of the hinge leaf 50 to the ledge 24 and the adjacent edge of the hinged member 52.

I claim:

1. A generally U-shaped clamp for controlling fluid flow through a flexible tube, and comprising a base member forming one leg of the U, a fixed upstanding wall forming the base of the U and acting as an abutment surface adjacent the rear edge of said base member and aperture means through which the tube is passed for location along said abutment surface, a top member overlying in flexible hinged relation to the base member, said top member forming the other leg of the U integrally attached adjacent the upper opposite edge of said wall abutment surface and having an integral clamp arm movable therewith and extending in inclined relation, downwardly and rearwardly toward said abutment surface and terminating in a clamping edge proximate to and traversing the tube location along said abutment surface, and adjacently positioned locking arms respectively on said base member and said top member with each of said arms having cooperating shoulder means mutually interengaged when the locking arms are lapped with one another upon movement of the top member toward the base member for holding the clamping edge in tube constricting position against the abutment surface and releasable from mutual interengagement upon relative lateral separating movement between said locking arms permitting separating movement between the base member and top member to remove the clamping edge from tube constricting position.

2. A clamp as claimed in claim 1, wherein the top member has a resilient hinge connection disposed between itself and said fixed wall whereby the top and base members tend to normally separate from one another upon release of the interengagement between the shoulder means and said hinge maintains a predetermined lateral orientation between the top and base members for permissive re-engagement between the shoulder means when the top and base members are again pressed together.

3. A clamp as claimed in claim 2, wherein the top and base members are provided with finger gripping portions adjacent the front edges thereof in general opposition to one another for inward pressure thereon to separate the shoulder means with relative lateral movement of the top and base members out of the predetermined orientation therebetween whereby to permit the top and base members to return to normal separated and laterally oriented positions.

4. A clamp as claimed in claim 3, wherein the finger gripping portions are in the form of corner posts on the top and base members respectively.

5. A clamp as claimed in claim 1, wherein the shoulder means on the base member locking arm comprises at least two downwardly facing and vertically spaced shoulder surfaces for cooperation with a single upwardly facing shoulder surface on the top member locking arm for holding said clamping edge in relatively adjustable tube constricting position, at least the upper shoulder surface on the base member locking arm being inclined downwardly toward the abutment surface to provide mutually coextensive surface engagement with the shoulder surface on the top member locking arm when engaged therewith when said top member is locked in a non-parallel relation to said base member.

6. A clamp as claimed in claim 1, wherein the upstanding wall at the rear end of the base member has an inwardly extending ledge in generally parallel opposition to the base member to which the top member is hingedly connected, and wherein the base member and ledge are provided with centrally disposed vertically aligned apertures for receiving the tubing for its location along the abutment surface, each of the aligned apertures laterally communicates with the edge of the ledge and base member, respectively, to facilitate assembly and removal therethrough of the tubing relative to the clamp.

7. A clamp as claimed in claim 6, wherein vertical shoulder means are provided between each aperture and an enlarged recess located between the aperture and the edge of said ledge and base member, respectively to releasably trap the tubing in assembly with the clamp.

* * * * *